(12) United States Patent
Sawa et al.

(10) Patent No.: US 7,120,664 B2
(45) Date of Patent: Oct. 10, 2006

(54) WEB PAGE PROVIDING METHOD, SERVER MACHINE, WEB PAGE PROVIDING PROGRAM, AND COMPUTER READABLE MEDIUM

(75) Inventors: Hirofumi Sawa, Kawasaki (JP); Takeshi Ito, Kawasaki (JP); Yumi Asano, Kawasaki (JP); Akira Tashiro, Kawasaki (JP); Hitoshi Monma, Kawasaki (JP); Hiroaki Nishimura, Kawasaki (JP); Hiroyuki Sato, Kawasaki (JP); Junichi Tokutake, Kawasaki (JP); Miwako Isa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 691 days.

(21) Appl. No.: 10/107,397

(22) Filed: Mar. 28, 2002

(65) Prior Publication Data

US 2002/0198758 A1    Dec. 26, 2002

(30) Foreign Application Priority Data

Jun. 26, 2001  (JP)  .............................. 2001-193226

(51) Int. Cl.
G06F 15/16 (2006.01)
G06F 9/46 (2006.01)

(52) U.S. Cl. ........................... 709/203; 709/217; 705/9

(58) Field of Classification Search ................ 709/203, 709/206, 218, 223, 224, 227, 238, 217; 705/7, 705/8, 9

See application file for complete search history.

(56) References Cited

U.S. PATENT DOCUMENTS

| | | | |
|---|---|---|---|
| 5,765,140 A * | 6/1998 | Knudson et al. ................ 705/9 |
| 5,907,829 A * | 5/1999 | Kida ............................... 705/9 |
| 6,014,698 A * | 1/2000 | Griffiths ...................... 709/224 |
| 6,338,097 B1 * | 1/2002 | Krenzke et al. ............. 719/329 |
| 6,401,079 B1 * | 6/2002 | Kahn et al. .................... 705/30 |
| 6,567,848 B1 * | 5/2003 | Kusuda et al. .............. 709/219 |
| 6,578,004 B1 * | 6/2003 | Cimral et al. ................... 705/7 |
| 6,604,124 B1 * | 8/2003 | Archbold .................... 718/103 |
| 6,889,196 B1 * | 5/2005 | Clark ............................. 705/9 |
| 6,892,354 B1 * | 5/2005 | Servan-Schreiber et al. ..... 715/733 |
| 2002/0040313 A1 * | 4/2002 | Hunter et al. .................. 705/9 |

FOREIGN PATENT DOCUMENTS

JP         09-081448          3/1997

(Continued)

*Primary Examiner*—Ario Etienne
*Assistant Examiner*—El Hadji M. Sall
(74) *Attorney, Agent, or Firm*—Staas & Halsey LLP

(57) ABSTRACT

A computer network system for implementing a web page providing method is composed of a personnel management system of a user, terminals operated by respective employees belonging to the user, and a server, which are connected to each other via a network. The server stores an employee management table defining the respective roles of the employees' a content management table listing URLs for contents to be provided to the employees, a roll management table defining providable contents and conditions for providing the contents for every role, and a displaying attribute management table defining a work schedule of each of the employees. These tables are updated whenever new data is received from the personnel management system. If a portal screen is requested from a terminal operated by any one of the employees, the web page providing program stored in the server causes a CPU to generate an HTML file for displaying, on the terminal, the portal screen incorporated with only the contents that can be provided in accordance with the conditions recorded in the individual tables and to transmit the HTML file to the terminal.

9 Claims, 20 Drawing Sheets

FOREIGN PATENT DOCUMENTS

| | | |
|---|---|---|
| JP | 11-272574 | 10/1999 |
| JP | 11-328187 | 11/1999 |
| JP | 2001-051822 | 2/2001 |

\* cited by examiner

FIG.4

51 Employee Data Table

| Employee Identification No. | Name | Assignment Code | Assigned Department | Title Code | Title |
|---|---|---|---|---|---|
| 820040 | Ichiro Suzuki | 3001 | Sales Department Section 1 | 04 | Chief of Section |
| 900200 | Yuji Kobayashi | 3001 | Sales Department Section 1 | 06 | No Title |
| 810020 | Taro Sato | 5001 | Manufacturing Department Section 1 | 04 | Chief of Section |
| 950432 | Yuichi Nakajima | 5001 | Manufacturing Department Section 1 | 06 | No Title |

FIG.5

52 Work Management Table

| Employee Identification No. | Date | Day of Week | Work Hours' Type | Work Hours' Type Code | Attendance | Attendance Code | Arrival Time | Departure Time | Overtime Working Hour(s) |
|---|---|---|---|---|---|---|---|---|---|
| 820040 | 0501 | Mon. | Normal | 01 | Business Trip | 01 | | | |
| 820040 | 0502 | Tue. | Normal | 01 | | 00 | 0900 | 2000 | 2.0 |
| 820040 | 0503 | Wed. | Normal | 01 | | 00 | | | |
| 820040 | 0504 | Thu. | Normal | 01 | | 00 | | | |
| 820040 | 0505 | Fri. | Normal | 01 | | 00 | | | |
| 820040 | 0506 | Sat. | Normal | 01 | Holiday | 05 | | | |
| 820040 | 0507 | Sun. | Normal | 01 | Holiday | 05 | | | |
| 820040 | 0508 | Mon. | Irregular | 02 | Leave | 02 | | | |
| 820040 | 0509 | Tue. | Irregular | 02 | | 00 | | | |

FIG.6

53 Working Hour Management Table

| Work Hour's Type Code | Work Hour's Type | Arrival Time | Departure Time | 1st Break Starting Time | 1st Break Ending Time | 2nd Break Starting Time | 2nd Break Ending Time |
|---|---|---|---|---|---|---|---|
| 01 | Normal | 9:00 | 17:30 | 12:00 | 13:00 | 17:30 | 18:00 |
| 02 | Irregular | 13:00 | 21:30 | 18:00 | 19:00 | 21:30 | 22:00 |

FIG.9

61 Contents Management Table

| Content No. | Content Provider's Name | Content Name | URL |
|---|---|---|---|
| 000001 | User A | Sales Support | http://eigyo.aaa.co.jp |
| 000002 | User A | Production Data | http://seizo.aaa.co.jp |
| 000003 | Fuji Trading Co. | Workplace Selling | http://hanbai.co.jp |
| 000004 | User A | Reimbursement for Business Trip Expenses | http://biztrip.aaa.co.jp |
| 000005 | Tokyo Travel | Route Services | http://transit.co.jp |
| 000006 | User B | Sales Support | http://sales.bbb.co.jp |
| ... | ... | ... | ... |

FIG.10

62 Roll Management Table

| Company Identification No. | Assignment Code | Title Code | Roll ID | Access Condition ||||| 
|---|---|---|---|---|---|---|---|---|
| | | | | 000001 | 000002 | 000003 | 00004 | 000005 |
| 000001 | 3001 | 04 | eigyo01 | A | D | A | A | A |
| 000001 | 3001 | 06 | eigyo02 | A | D | C | B | E |
| 000001 | 5001 | 04 | seizo01 | D | A | A | A | A |
| 000001 | 5001 | 06 | seizo02 | D | A | C | B | E |

FIG.11

63 Employee Management Table

| Company Identification No. | Employee Identification No. | Name | Assigned Department | Assignment Code | Title | Title Code | Log-In ID | Password |
|---|---|---|---|---|---|---|---|---|
| 000001 | 820040 | Ichiro Suzuki | Sales Department Section 1 | 3001 | Chief of Section | 04 | user01 | passwd01 |
| 000001 | 900200 | Yuji Kobayashi | Sales Department Section 1 | 3001 | No Title | 06 | user02 | passwd02 |
| 000001 | 810020 | Taro Sato | Manufacturing Department Section 1 | 5001 | Chief of Section | 04 | user03 | passwd03 |
| 000001 | 950432 | Yuichi Nakajima | Manufacturing Department Section 1 | 5001 | No Title | 06 | user04 | passwd04 |

FIG.12

64 Displaying Attribute Management Table

| Company Identification No. | Employee Identification No. | Roll ID | Date | Arrival Time | Departure Time | 1st Break Starting Time | 1st Break Ending Time | 2nd Break Starting Time | 2nd Break Ending Time | Attendance Identification No. |
|---|---|---|---|---|---|---|---|---|---|---|
| 000001 | 820040 | eigyo01 | 0501 | 0900 | 1730 | 1200 | 1300 | 1730 | 1800 | 00 |
| 000001 | 820040 | eigyo01 | 0502 | 0900 | 1730 | 1200 | 1300 | 1730 | 1800 | 00 |
| 000001 | 900200 | eigyo02 | 0501 | 0900 | 1730 | 1200 | 1300 | 1730 | 1800 | 01 |
| 000001 | 900200 | eigyo02 | 0502 | 0900 | 1730 | 1200 | 1300 | 1730 | 1800 | 00 |
| 000001 | 810020 | seizo01 | 0501 | 0900 | 1730 | 1200 | 1300 | 1730 | 1800 | 02 |
| 000001 | 810020 | seizo01 | 0502 | 0900 | 1730 | 1200 | 1300 | 1730 | 1800 | 02 |
| 000001 | 950432 | seizo02 | 0501 | 1300 | 2130 | 1800 | 1900 | 2130 | 2200 | 00 |
| 000001 | 950432 | seizo02 | 0502 | 1300 | 2130 | 1800 | 1900 | 2130 | 2200 | 00 |

65 Attendance Management Table

| Company Identification No. | Attendance Identification No. | Attendance | Attendance Code |
|---|---|---|---|
| 000001 | 00 | Office Work | 00 |
| 000001 | 01 | Business Trip | 01 |
| 000001 | 02 | Leave | 02 |
| 000001 | 03 | Holiday | 05 |

FIG.23

Examples of Screen Generated at 17:00 on May 1 (Thu.)

| Employee No. | Name | Roll ID | Screen Layout |
|---|---|---|---|
| 820040 | Ichiro Suzuki | eigyo01 | Common Frame / Sales Support / Reimbursement for Business Trip Expenses / Workplace Selling / Route Services |
| 900200 | Yuji Kobayashi | eigyo02 | Common Frame / Sales Support / Reimbursement for Business Trip Expenses / Route Services |
| 810020 | Taro Sato | seizo01 | Common Frame / Production Data / Reimbursement for Business Trip Expenses / Workplace Selling / Route Services |
| 950432 | Yuichi Nakajima | seizo02 | Common Frame / Production Data / Reimbursement for Business Trip Expenses |

WEB PAGE PROVIDING METHOD, SERVER MACHINE, WEB PAGE PROVIDING PROGRAM, AND COMPUTER READABLE MEDIUM

BACKGROUND OF THE INVENTION

1. Field of the Invention

The present invention relates to a web page providing method for transmitting, to each of employees working for a user, a web page customized in accordance with actual work condition of the employee, a server machine for implementing such a web page providing method, a web page providing program for causing a computer to function as such a server machine, and a computer readable medium storing therein such a web page providing program.

2. Description of the Prior Art

Upon receipt of a URL, a user computer connected to the Internet and executing a WWW browser program accesses a web server indicated by the URL, receives an HTML file stored at a site indicated by the URL, and displays a web page with content according to a hypertext in the file. Such a web system allows a user operating the user computer to browse information published on the Internet by world-wide web servers.

A web server (web site) providing a web page (portal screen) appropriate to be initially accessed by a user computer just after it activating the WWW browser is normally termed a portal site. A portal screen transmitted from such a portal site to the user computer is typically designed so that it contains an item linked to another site or an item for operating a search engine for searching another web page. In some cases, a portal site displays information for users provided by its administrator on the portal screen.

In recent years, a service provider under a contract with a specified user (a government agency, a municipal organization, a company, or a personal employer) has offered them a service of providing, only to employees working for the user, a portal screen with contents intended for the employees via the Internet by the use of such a web system. Information provided on the portal screen for each of the employees under such a service includes data on the work of the employee and data on employee benefits, more specifically, data on a personnel notice about promotion or demotion, data for sales support such as clients' information, data on a company sport club, a company trip, workplace selling, and so on. This causes the necessity to partly or entirely limit the viewing of the contents depending on the assignment department and title of the employee who accesses a site showing the portal screen or on whether or not the access time falls within his/her working hours.

According to the conventional service of providing the portal screen to employees, however, each of the employees or a system administrator assigned by the user should periodically update control data including the title and working hours of each of the employees. If the employee in charge neglects to update the control data, the problem is encountered that data unnecessary for work operations are displayed on the portal screen intended for the employees on duty or that data for supervisory employees are displayed on the portal screen for subordinate employees.

Particularly, in case the user adopts, e.g., a flex-time or three-shift system as a working system for the employees instead of a fixed time working system, the working hours of the individual employees are frequently determined in properly.

The server providing such a portal screen can be accessed via a public switched line from the outside of the office. However, if an access to the contents on the portal screen is controlled based only on the control data including the title and working hours of each of the employees, it is impossible to determine whether the employee who has made the access is at a business trip destination on duty or at home on a leave.

SUMMARY OF THE INVENTION

The present invention is a web page providing method for providing, when an employee working for a user requests a web page intended for himself or herself, a web page with contents according to his or her actual work condition (such as, working hours, distinction of a work day or leave, and so on) for the employee, even if the actual work condition is irregular or changed without notice, a server machine capable of implementing such a web page providing method, a web page providing program for causing a computer to function as such a server machine, and a computer readable medium storing therein such a web page providing program.

The web page providing method according to the present invention requires a first table defining a roll of each of employees belonging to a user, a second table defining providable contents and their providing conditions for every role, and a third table defining a work schedule of each of the employees. The web page providing method according to the present invention is implemented by updating the first through third tables in response to an instruction from the user, and by reading, if a web screen is requested from a terminal operated by any one of the employees, the role of the employee out of the first table, reading, a definition of content providable for the role read out of the first table and its providing condition from the second table, reading the work schedule of the employee out of the third table, generating screen data for displaying a screen incorporated with at least one content defined by the definition read out of the second table of which providing condition is satisfied by the work schedule read out of the third table, and transmitting the generated screen data to the terminal.

According to the present invention, the content to be incorporated into the screen provided for requesting one of the employees belonging to the user is limited to that of which providing condition read out of the second table in compliance with the role of the employee is satisfied by the work schedule of the employee. Since the work schedule of the employee is read out of the third table which is updated in response to an instruction from the user, it is high probable to show the actual working conditions of the employee. Since the role of the employee is read out of the first table which is also updated in response to the instruction from the user, it is highly probable to show the actual role of the employee. As a result, only the content corresponding properly to the actual role and work schedule of the employee is provided to the employee.

BRIEF DESCRIPTION OF THE DRAWINGS

The invention will be described below in detail with reference to the accompanying drawings, in which:

FIG. 4 is a diagram showing a data structure in an employee data table stored in the personnel management system;

FIG. 5 is a diagram showing a data structure in a work management table stored in the personnel management system;

FIG. 6 is a diagram showing a data structure in a working hour management table stored in the personnel management system;

FIG. 9 is a table showing a data structure in a content management table stored in the server machine;

FIG. 10 is a diagram showing a data structure in a role management table stored in the server machine;

FIG. 11 is a diagram showing a data structure in an employee management table stored in the server machine;

FIG. 12 is a diagram showing a data structure in a displaying attribute management table stored in the server machine;

FIG. 23 is a diagram showing examples of a screen layout of a portal screen generated by the web page displaying process.

DESCRIPTION OF THE PREFERRED EMBODIMENTS

Figure 1:
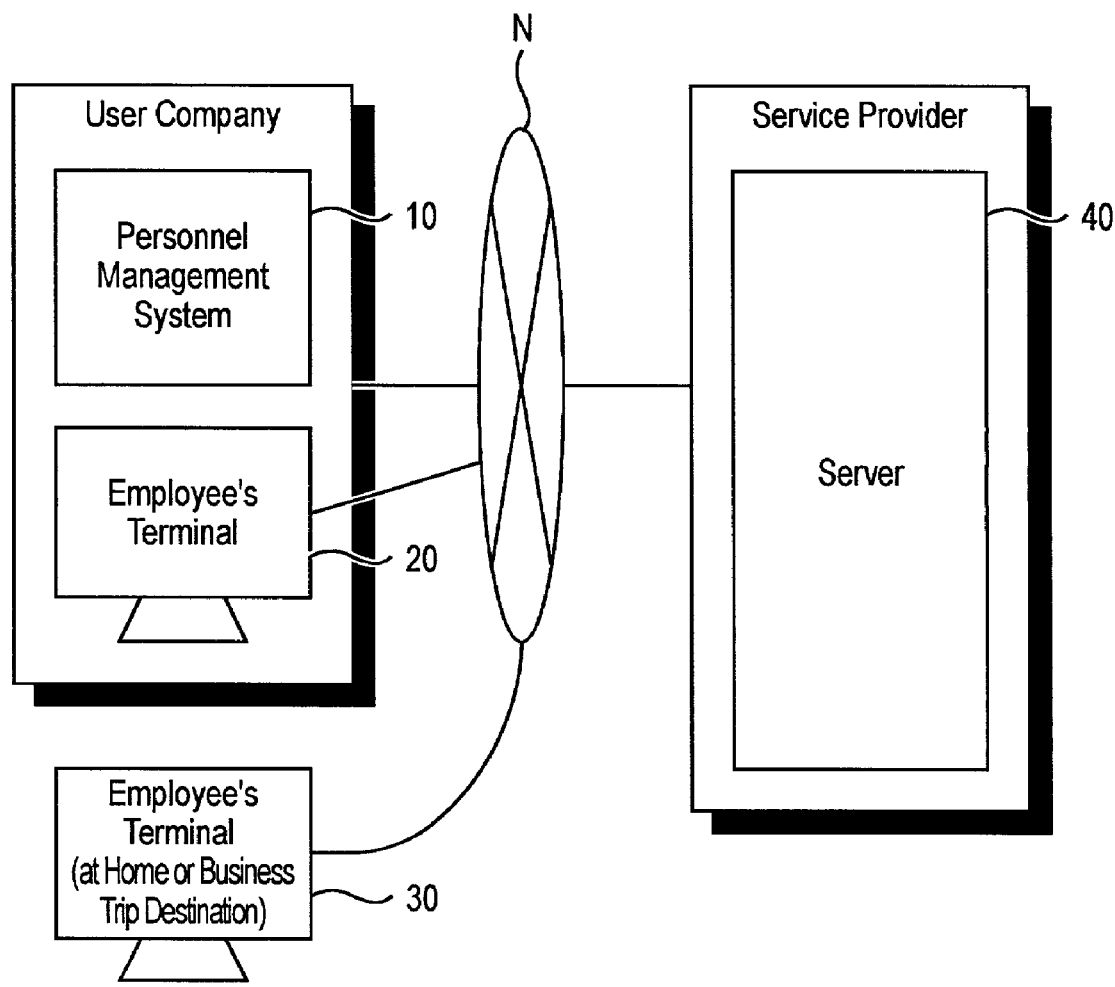
FIG. 1 is a schematic structural view of a computer network system in an embodiment of the web page providing method according to the present invention.

Referring now to the drawings, preferred embodiments of the present invention will be described herein below.

In accordance with a web page providing method of the present embodiment, if an employee working for a user (that is one of a government agency, a municipal organization, a company and a personal employer) under contract with a service provider operating a server requests a portal screen from the server, the server responds to the request with a portal screen containing information intended for all the employees of the user as well as information according to the actual work condition (i.e., attribute composed of a department to which the employee is assigned and a position held by the employee, and the attendance of the employee on his or her working days) of the requesting employee. Although the service provider can contract with a plurality of and a variety of users to provide such a portal screen, a description will be given herein below by considering only one user company.

FIG. 1 schematically shows a configuration of a web page providing system for implementing the web page providing method according to the present embodiment. As shown in FIG. 1, the web page providing system is constituted of a personnel management system 10 for managing various information on personnel matters and working hours of each of the employees belonging to the user company, a terminal 20 operated by any of the employees in an office of the user company, a terminal 30 operated by any of the employees at home or a business trip destination, and a server machine 40 controlled by a service provider, which are connected to one another via the Internet N.

The personnel management system 10 is a typical system for personnel management which is used in a large number of companies and which is a commercially available computer installed with software for managing various information on personnel matters and working hours of each of the employees.

Figure 2:
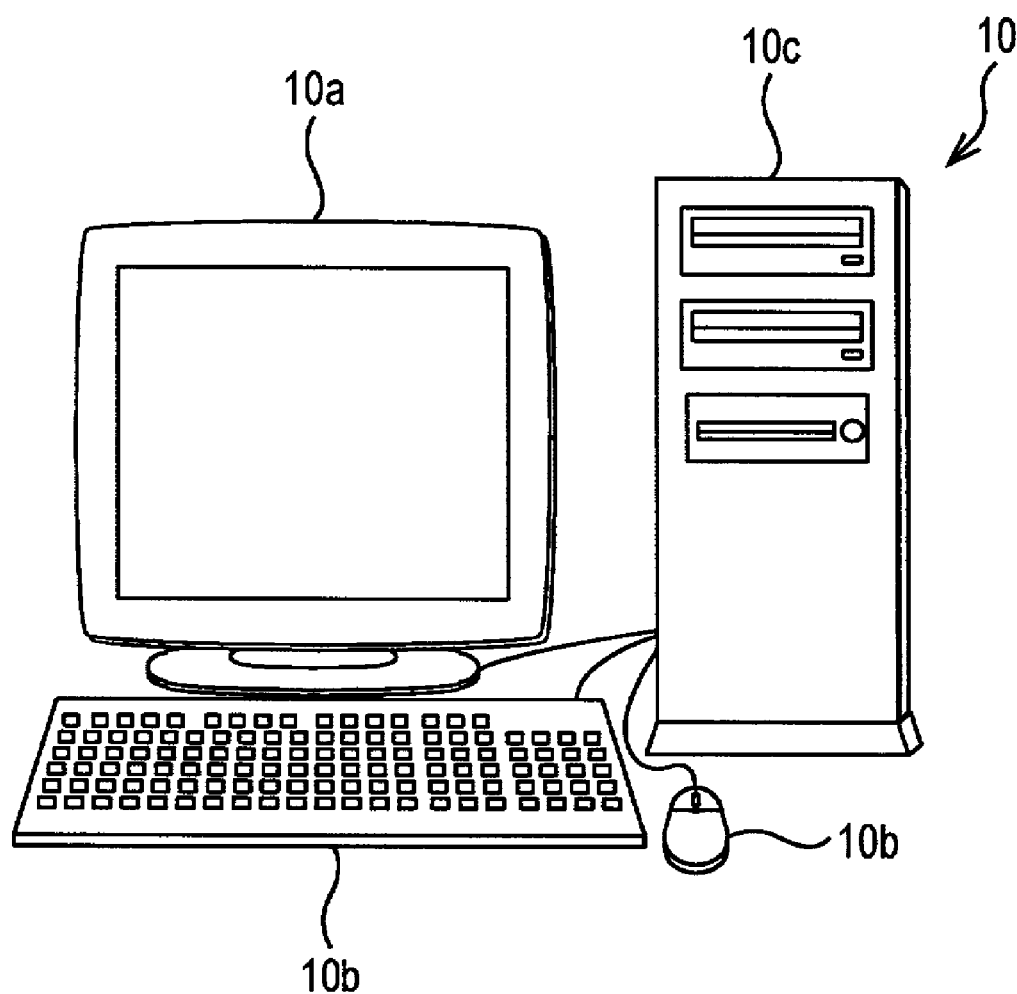
FIG. 2 is an outer view of a typical computer.
Figure 3:
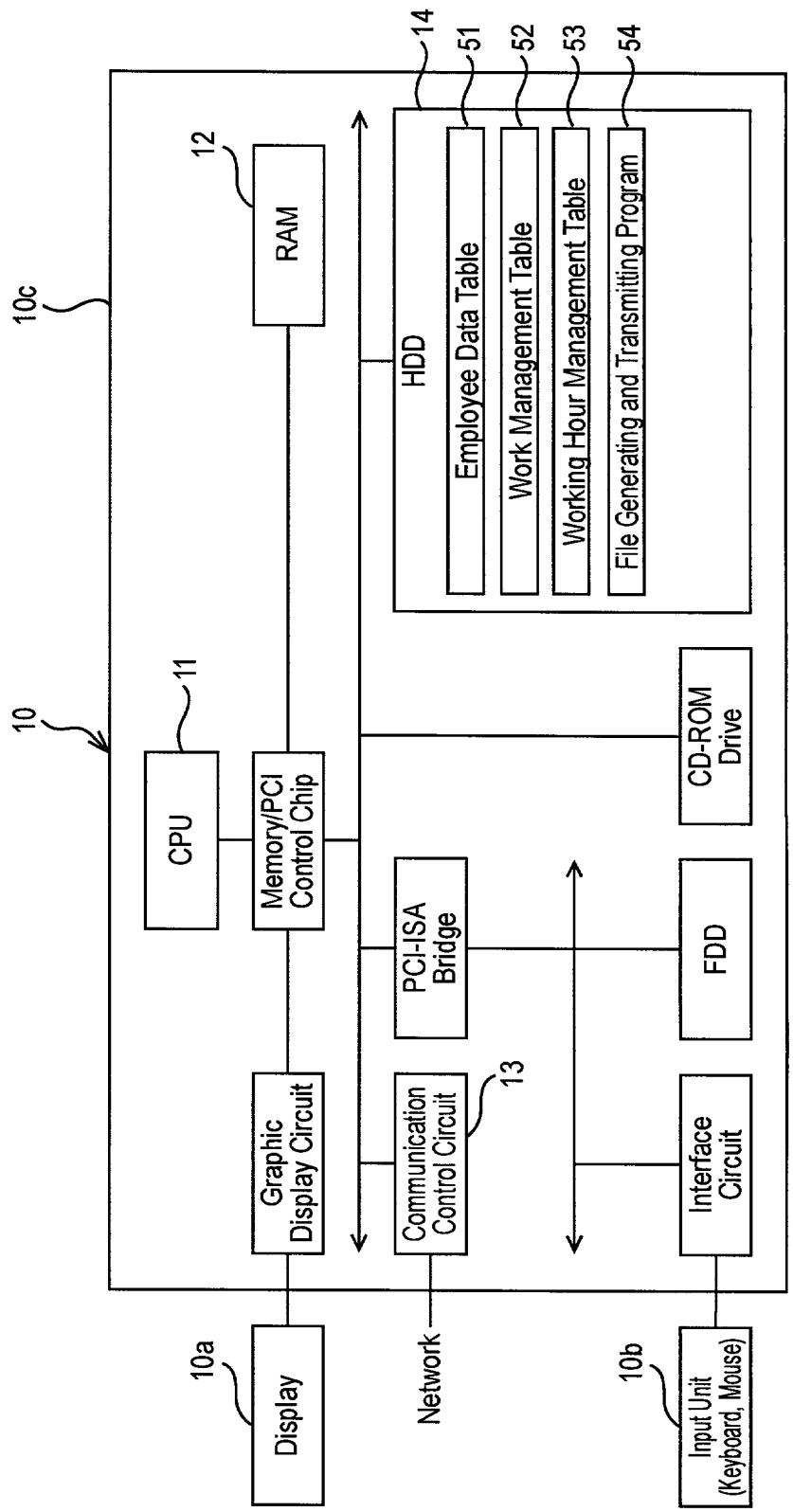
FIG. 3 is a block diagram schematically showing a configuration of the internal circuit of a personnel management system.

FIG. 2 is an outer view of a computer composing the personnel management system 10. The computer has a display 10a as a display unit for displaying a variety of screens, an input unit 10b such as a keyboard and a mouse, and a main unit 10c connected to the display 10a and to the input unit 10b. FIG. 3 is a block diagram showing a configuration of the internal circuit of the main unit 10c. As shown in FIG. 3, the internal circuit of the main unit 10c is composed of hardware including a CPU 11, a RAM 12, a communication control circuit 13, and an HDD 14.

The CPU 11 is a central processing unit for integrally controlling the individual items 12 to 14 of the hardware. The RAM 12 is a random access memory which caches various programs read by the CPU 11 and also serves as a work area for the CPU 11. The communication control circuit 13 is a network adopter, a modem, a DSU or a NIC connectable to the Internet N via a communication line such as a a phone line or LAN and controls data transmission and reception to and from other computers through the network N.

The HDD 14 is a storage unit from and in which various data and programs are read and written. The HDD 14 stores various data used in a process performed by the CPU 11, application programs executed by the CPU 11 to provide various functions, and OS (Operating System) programs for managing the execution of the application programs and the network. The application programs stored in the HDD 14 include a program for managing data on the employees stored in individual tables 51 to 53, which will be described later, and a database program. A file generating and transmitting program 54 for providing the function of generating and transmitting a file is also included therein.

The data stored in the HDD 14 also includes an employee data table 51, a work management table 52, and a working hour management table 53.

The employee data table 51 is a table for storing data on the personnel matters of each of the employees. FIG. 4 logically shows a data structure therein. As shown in FIG. 4, the employee data table 51 is composed of records respectively consisting of the fields of an employee identification number, a name, an assignment code, an assigned department, an assignment code, a title, and a title code, which are produced for every employee. The employee identification number is an identification number defined by the company to identify each of the employees. The name is the name of each of the employees. The assigned department is the name of a department to which each of the employees is assigned. The assignment code is identification data defined by the company to identify the individual assigned department. The title is the name of a position held by each of the employees. The title code is identification data defined by the company to identify the individual titles.

The work management table 52 is a table for storing data on the working hours of the individual employees. FIG. 5 logically shows a data structure therein. As shown in FIG. 52, the work management table 52 is composed of records respectively consisting of the fields of date, a day of the week, a working hours type, a working hours' type code, attendance, an attendance code, an arrival time, a departure time, and an overtime working hour, which are produced for every employee and for every day. The date and the day of the week are the fields for respectively recording a date and a day of the week of a target day. The working hours' type is the field for recording the type of working hours (fixed-time work, a night shift (irregular work), flex-time work, or the like) of each of the employees on a target day. The working hours' type code is identification data defined by the company to identify the respective working hours' types. The attendance is the field for recording data about where-abouts (office work, a business trip, or a leave) of each of the employees scheduled on a target day. The attendance code is identification data defined by the company to identify the whereabouts of the employee. The arrival time, the departure time, and the over-time working hour are the fields for respectvely recording the arrival time, the departure time, and the over-time working hour of each of the employees scheduled on a target day. "NULL" is written in each of the fields of the arrival time and the departure time, if the arrival time or the departure time defined in the working hour management table 53, which will be described later, are coincident with the scheduled time on the target day. Time is recorded in each of the fields of the arrival time and the departure time only if over-time work is scheduled on the target day.

The working hour management table 53 is a table recording arrival time and departure time and break time predetermined on every type of working hours. FIG. 6 logically shows a data structure therein. As shown in FIG. 6, the working hour management table 53 is composed of records respectively consisting of the fields of the working hours' type, the working hours' type, the arrival time, the departure time, a first break starting time, a first break ending time, a second break starting time, and a second break ending time, which are produced for every working hours' type.

Figure 7:
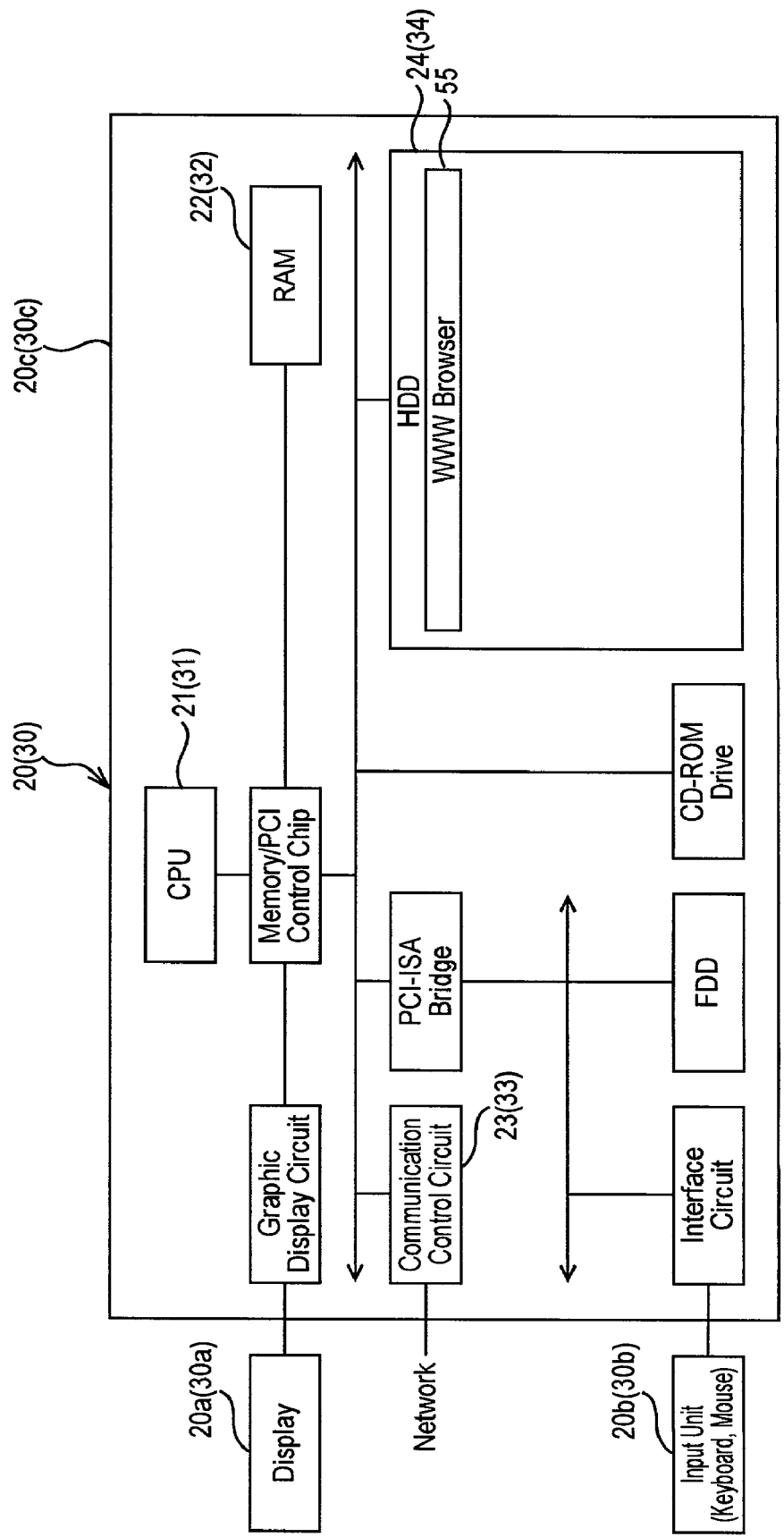
FIG. 7 is a block diagram schematically showing a configuration of an internal circuit of a terminal.

The terminals 20 and 30 are typical computers of desk-top type, notebook type, and the like as shown in the perspective view of FIG. 2. FIG. 7 is a block diagram schematically showing a configuration of the internal circuit of the main unit 20c (30c) of the terminal 20 (30). As shown in FIG. 7, the internal circuit of the main unit 20c (30c) is composed of a CPU 21 (31), a RAM 22 (32), a communication control circuit 23 (33), an HDD 24 (34), and so on. The description of these hardware items will be omitted since they are the same as those shown in the block diagram of FIG. 3. It is to be noted that the tables 51 to 53 shown in FIGS. 4 to 6 and a program for personnel management are not stored in the HDD 24 (34) of the terminal 20 (30). Instead, a data browsing program 55 termed a WWW (World Wide Web) browser is stored therein.

If a network address termed a URL (Uniform Resource Locator) is inputted through the input unit 20b (30b), while the WWW browser 55 is executed by the CPU 21 (31), the WWW browser 55 directs the CPU 21 (31) to access a web server indicated by the URL and request a file stored at a site indicated by the URL. Upon receipt of an HTML (Hyper-Text Mark-Up Language) file in response to the request, the CPU 21 (31) is directed to read hypertext data stored in the file so that a web page indicated by the hypertext data is displayed on a display 20a (30a). The request for and reception of the file is performed in accordance with TCP/IP (Transmission Control Protocol/Internet Protocol) and HTTP (Hyper-Text Transfer Protocol).

The terminal 20 operated by any one of the employees belonging to the company is among a plurality of terminals connected to one another through an intranet (not shown) on a WAN or LAN constructed in the offices of the company. Consequently, the terminal 20 transmits and receives data between itself and an outside web server on the Internet N through a web server (not shown) intended for the outsiders of the company to which the terminal 20 itself is connected via the intranet and a fire wall (not shown).

On the other hand, the terminal 30 operated by any one of the employees at home or at a business trip destination is connected to gateway equipment managed by an internet connecting agent termed an Internet service provider via a public switched line, a cable television antenna line, an electric power line, a radio system, or the like. As a consequence, the terminal 30 transmits and receives data between itself and an outside web server on the Internet N via the gateway equipment of the provider.

Figure 8:
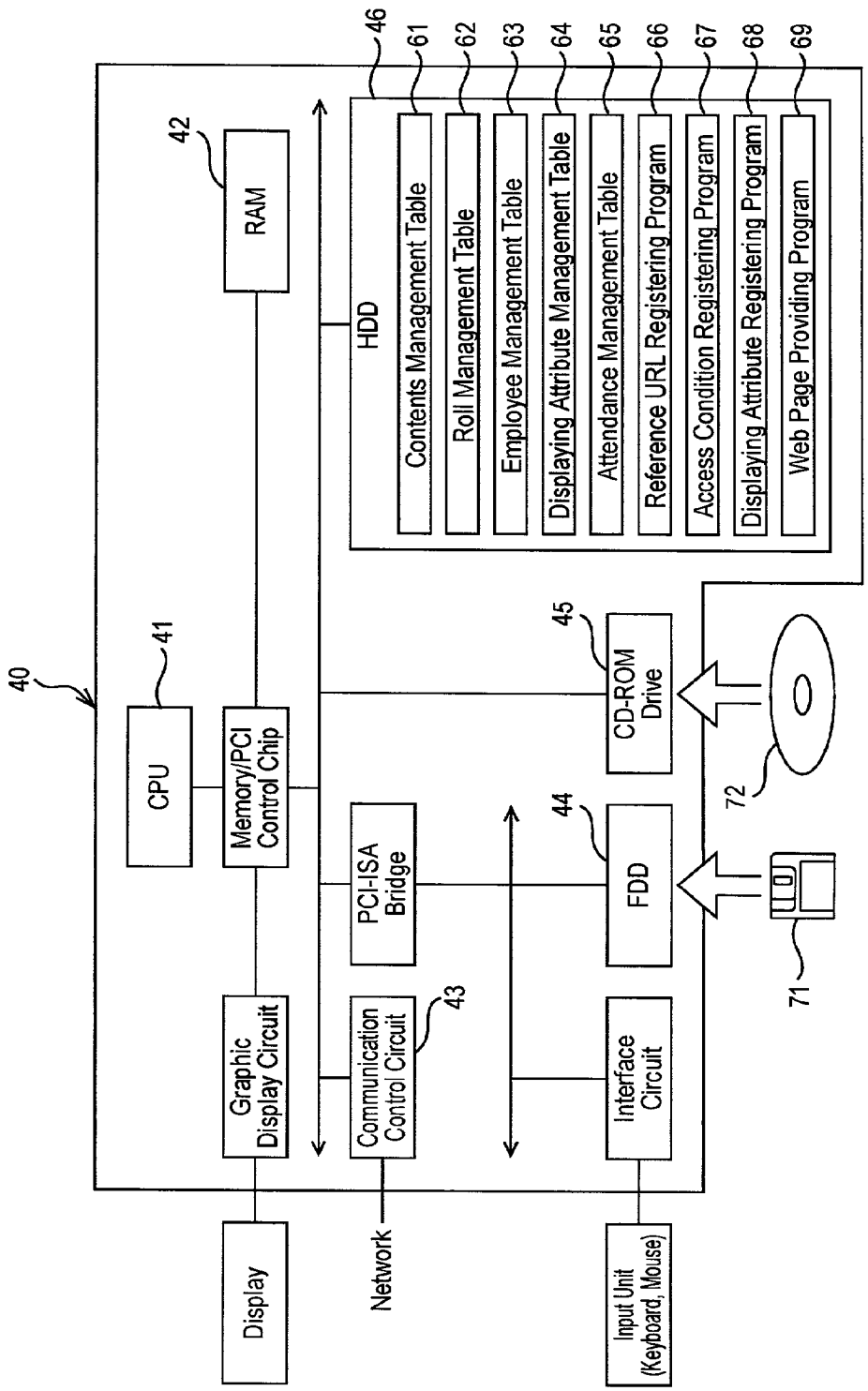
FIG. 8 is a block diagram schematically showing a configuration of the internal circuit of a server machine.

FIG. 8 is a block diagram schematically showing a configuration of the internal circuit of the server machine 40. As shown in FIG. 8, the server machine 40 is composed of a CPU 41 (corresponding to a processing unit), a RAM 42, a communication control circuit 43 (corresponding to a communicating unit), an FDD 44, a CD-ROM drive 45, an HDD 46 (corresponding to first and second storage units), and so on. The description of the CPU 41, the RAM 42, and the communication control circuit 43 will be omitted since they are the same as those shown in the block diagram of FIG. 3.

When various programs, data, or upgrade versions thereof are to be installed, a flexible disk 71 or a CD-ROM disk 72, which are computer readable media stored with these programs or data are loaded in the FDD 44 and the CD-ROM drive 45, so that the programs or data are read out of the flexible disk 71 and the CD-ROM disk 72. The programs and data thus read out are installed in the HDD 46 as a storage unit.

The HDD 46 stores various data, application programs, and OS programs. The data stored in the HDD 46 includes HTML files in which data for displaying web pages with various contents are stored, image files, and the like. Respective URLs have been assigned to the locations at which the HTML files and the image files are stored. In response to an instruction from the CPU 41, the HTML files and the image files are transmitted to the terminal 20 or 30 that has accessed thereto by specifying the URLs indicative of the storage locations and the file names. There are web pages which include tool buttons (icons) to which any URLs have been assigned as hyperlink's destinations. If such a web page is displayed on any one of the terminals 20 and 30 and a tool button on the web page is clicked, the WWW browser 55 executed on the terminal 20 or 30 transmits a request message specifying the URL assigned to the tool button.

The data stored in the HDD 46 includes a contents management table 61, a roll management table 62, an employee management table 63, a displayed attribute management table 64, and an attendance management table 65. For one server machine 40, only one service management table 61 is provided because it is commonly used by all users to which the service provider operating the server machine 40 offers a portal screen providing service. The number of the other tables 62 through 65 is equal to that of the users since they are prepared for every user.

The contents management table 61 (corresponding to a part of the second table) is one defining data on contents that can be incorporated into a portal screen. FIG. 9 logically shows a data configuration therein. As shown in FIG. 9, the contents management table 61 is composed of records respectively consisting of the fields of "Content No.", "Content Provider's Name", "Content Name", and "URL", which are prepared for respective contents that can be incorporated into the portal screen intended for employees. The "Content No." is an identification number for identifying each of the contents. The "Content Provider's Name" is the name of the company providing each of the contents. If a user provides an internal document as a content to the employees, the name of the user is filled in the field of "Content Provider's Name". The "Content Name" is a name indicative of each of the contents. The "URL" is the network address of a web site providing each of the contents.

The roll management table 62 (corresponding to a part of the second table) is one defining conditions for incorporating, into a portal screen, each of the contents corresponding to the attribute (the assigned department and title, i.e., the role) of each of the employees and the work schedule (working hours and attendance) of the employee. FIG. 10 logically shows a data structure therein. As shown in FIG. 10, the roll management table 62 is composed of records respectively consisting of the fields of a company identification number, an assignment code, a title come, a roll ID, and an access condition (content providing condition), which are prepared for respective rolls (in other words, the combinations of the assignment codes and the title codes, i.e., the attributes). The company identification number is one defined by the service provider to identify individual users. The roll ID is identification data defined by the service provider to identify individual rolls (the combinations of the assignment codes and the title codes). The access condition is the field defining the conditions for incorporating each content into the portal screens intended for the employees having the individual rolls (the combinations of the assignment codes and the title codes, i.e., the roll IDs). Accordingly, the field of the access condition is subdivided for every content number, so that ranks A to E are recorded in the sub-fields corresponding to the respective service numbers. The rank "A" indicates that the content indicated by the content number is constantly incorporated into the portal screen intended for the employee. The rank "B" indicates that the content is incorporated into the portal screen only during on-duty hours for the corresponding role. The rank "C" indicates that the content is incorporated into the portal screen only during off-duty hours for the corresponding role. The rank "D" indicates that the content is constantly kept from being incorporated in the portal screen. The rank "E" indicates that the content is incorporated in the portal screen only on the occasion of a business trip.

The employee management table 63 (corresponding to the first table) is one for storing personal data on all the employees. FIG. 11 logically shows a data structure therein. As shown in FIG. 11, the employee management table 63 is composed of records respectively consisting of the fields of the company identification number, the employee identification number, the name, the assigned department, the assignment code, title, the title code, a log-in ID, and a password, which are prepared for respective employees. The log-in ID and the password are data used to confirm the identity of the employee and assigned to each of the employees by the service provider.

The displayed attribute management table 64 (a third table) is one for defining a work schedule of each of the employees. FIG. 12 logically shows a data structure therein. As shown in FIG. 12, the displayed attribute management table 64 is composed of records respectively consisting of the fields of the company identification number, the employee identification number, the roll ID, the arrival time, the departure time, a first break starting time, a first break ending time, a second break starting time, a second break ending time, and an attendance identification number, which are prepared for respective employees and for every day. The attendance identification number is an identification number defined by the service provider to identify the whereabout (office work, a business trip, a leave, and so on) of each of the employees.

Figures 13, 14:
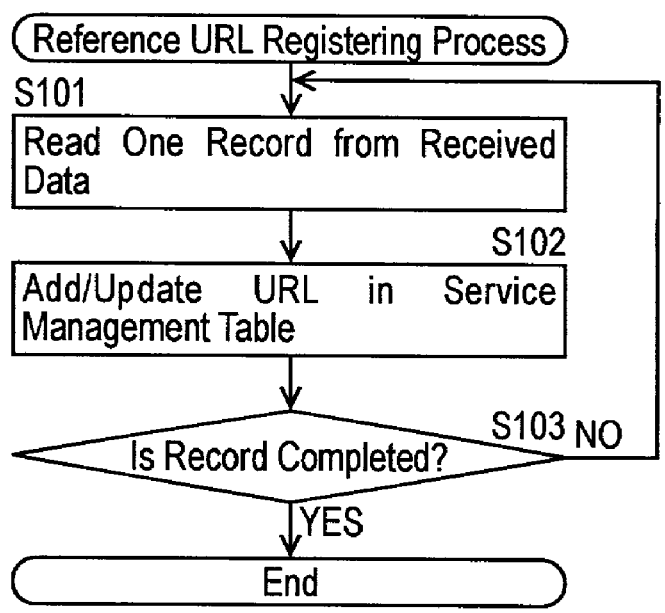
FIG. 13 is a diagram showing a data structure in an attendance management table stored in the server machine.
FIG. 14 is a flow chart illustrating a URL registering process performed in the server machine.

The attendance management table 65 is a table for converting the attendance code defined in the personnel management system 10 of the user to the attendance identification number used in the server machine 40. FIG. 13 logically shows a data structure therein. As shown in FIG. 13, the attendance management table 65 is composed of records respectively consisting of the fields of the company identification number, the attendance identification number, the attendance, and the attendance code, which are prepared for respective attendances.

The application programs stored in the HDD 46 include a URL registering program 66, an access condition registering program 67, a displaying attribute registering program 68, and a web page providing program 69.

The URL registering program 66 makes, if data on a content to be incorporated in a portal screen for employees is transmitted from the personnel management system 10, the CPU 41 record the data in the service management table 61.

The access condition registering program 67 makes, if data on an access condition is transmitted from the personnel management system 10, the CPU 41 record the data in the roll management table 62.

The displaying attribute registering program 68 makes, if a first file containing data on the assigned department and title of each of the employees and a second file containing data on the working hours and attendance of the employee are transmitted from the personnel management system 10, the CPU 41 record the data in the first and second files in the employee management table 63 and in the displayed attribute management table 64.

The web page providing program 69 makes, if there is a request for a portal screen from the terminal 20 or 30 via the Internet N, the CPU 41 confirm the identity of the requester and causing, if the requester is identified as any of the employees of the user, the CPU 41 generate data for displaying the portal screen with content according to the assigned department, title, working hours, and attendance of the employee and transmit an HTML file stored with the data for displaying the portal screen to the terminal 20 or 30. The web page providing program 69 is actually composed of a web server program and a CGI program or a servlet.

A description will be given herein below to a process performed in the web page providing system having the configuration described above. If the service provider has signed with a certain company to a contract to offer the service of providing a portal screen intended for the employees of the company as a user company, each of the tables 61 through 64 for the user company under the contract is generated prior to offering the service. The description will be given first to a process for updating each of the tables 61 through 64 and next to the process performed by the web page providing program 69.

URL Registering Process

In case a user adds internal documents to data which is to be incorporated as a content into the portal screen intended for the employees thereof and in case the user changes information (that is, the service names and URLS) on the internal documents, a system administrator employed by the user transmits a file containing one or more records (including the name of the user as the "content provider's name") obtained by formatting data after the addition or change from the personnel management system 10 of the company to the server machine 40. In the server machine 40 that has received the file, the CPU 41 reads the URL registering program 66, on reception of the file or on reception of a command transmitted by the system administrator employed by the company, whereby the URL registering process is initiated. FIG. 14 shows the URL registering process.

As shown in FIG. 14, in Step S101 which is the first step after the initiation of the URL registering process, the CPU 41 reads one record out of the received file.

Next, in Step S102, the CPU 41 checks whether or not a record containing the same content provider's name (that is, the name of the user) and the same content name as contained in the record read in Step S101 is stored in the service management table 61. If there is a record containing the same content provider's name and the same content name as contained in the record read in Step S101 in the service management table 61, the CPU 41 replaces the URL contained in the record in the service management table 61 with the URL in the record read in Step S101. Conversely, if there is not any record containing the same content provider's name (that is, the name of the user) and the same content name as contained in the record read in Step S101 in the contents management table 61, the CPU 41 assigns a new content number to the record read in Step S101 and adds the record to the table 61. The content number thus newly assigned is associated with the record read in Step S101 and reported to the personnel management system 10 of the file sender. On the other hand, the field of the access condition for the new content number is added to the roll management table 62 corresponding to the user and "NULL" is filled in the field of each record.

Next, in Step S103, it is checked whether or not an unprocessed record exists in the received file. If there is any unprocessed record, the CPU 41 returns the whole process to Step S101. If there is no unprocessed record, the CPU 41 terminates the URL registering process.

By the foregoing URL registering process, the contents management table 61 is updated.

Access Condition Registering Process

Figure 15:
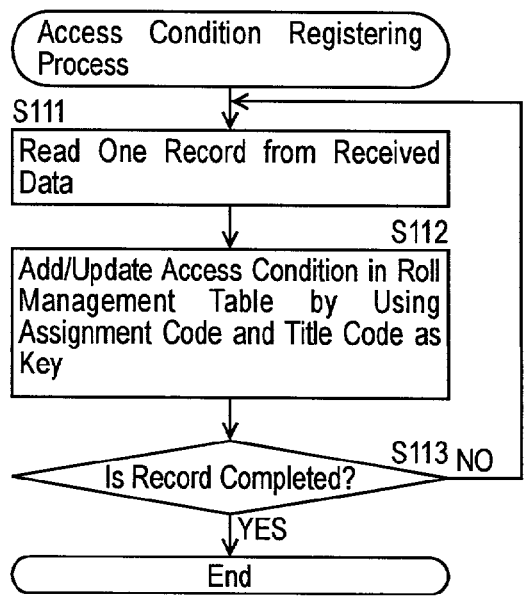
FIG. 15 is a flow chart illustrating an access condition registering process performed in the server machine.

If the user company is reorganized or if the user company changes the access conditions to be associated with the respective attributes (the assigned departments and titles) of the employees, the system administrator employed by the user company transmits a file containing one or more records (records each consisting of the individual fields of the assignment code, the title code, and the access condition determined on a per service-number basis) obtained by formatting data after the change from the personnel management system 10 of the company to the server machine 40. In the server machine 40 that has received the file, the access condition registering program 67 is read by the CPU 41 so that the access condition registering process is initiated. FIG. 15 shows the access condition registering process.

As shown in FIG. 15, in Step S111 which is the first step after the initiation of the access condition registering process, the CPU 41 reads one record from the transmitted file.

Next, in Step S112, the CPU 41 checks whether or not a record containing the same assignment code and the same title code as contained in the record read in Step S111 is stored in the roll management table 62. If there is a record containing the same assignment code and the same title code as contained in the record read in Step S111 in the roll management table 62, the CPU 41 replaces the access condition contained in the record in the roll management table 62 with the access condition in the record read in Step S111. Conversely, if there is not any record containing the same assignment code and the same title code as contained in the record read in Step S111 in the roll management table 62, the CPU 41 assigns a new roll ID to the record read in Step S111 and adds the record to the roll management table 62.

In Step S113, the CPU41 checks whether or not an unprocessed record exists in the received file. If there is any unprocessed record, the CPU 41 returns the whole process to Step S111. If there is no unprocessed record, the CPU 41 terminates the access condition registering program.

By the foregoing access condition registering process, the roll management table 62 corresponding to the user company as the file sender is updated.

Displaying Attribute Registering Process

Every time the scheduled working hours determined on any one type of working hours, attribute (that is, the assigned department or the title) of any one of the employees, or work schedule (attendance and actual working hours) of any one of the employees are changed at the user company, the employee data table 51, the work management table 52, or the working hour management table 53 each stored in the HDD 14 is updated in the personnel management system 10.

The personnel management system 10 periodically performs the process of extracting all records from each of the tables 51 to 53, storing the extracted records in one file, and transmitting the file to the server machine 40. The process is performed at, e.g., ten o'clock every morning. Therefor, even if any one of the employees takes a sudden leave of absence or an unexpected business trip, the changed schedule of the employee is reported to the server machine 40. However, the process need not necessarily be performed at ten o'clock every morning. The cycle and time for performing the process are determined appropriately under an agreement between the service provider and the user company. Specifically, the process is performed by the CPU 11 of the personnel management system 10 by reading the file generating and transmitting program 54 FIG. 16 shows the process.

Figure 16:
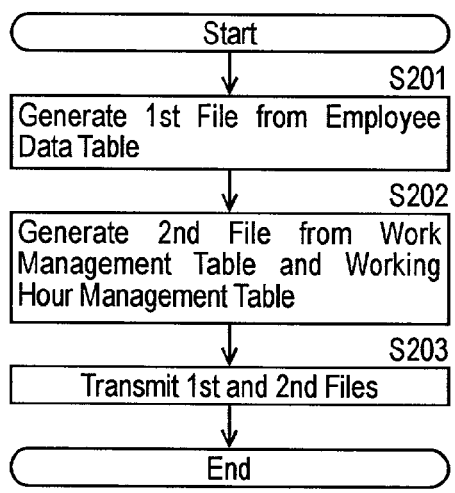
FIG. 16 is a flow chart illustrating a file generating and transmitting process performed in the personnel management system.

As shown in FIG. 16, in Step S201 which is the first step after the initiation of the process, the CPU 11 extracts all records from the employee data table 51 and generates a first file to be transmitted in which all the extracted records are stored.

Next, in Step S202, the CPU 11 reads all records out of the work management table 52 and adds, to each of the read records, the content of the record in the working hour management table 53 which contains the same working hour's type as contained in the read record, thereby generating a record to be transmitted which contains the employee identification number, the date, the arrival time, the departure time, the first break starting time, the first break ending time, the second break starting time, the second break ending time, and the attendance code. Then, the CPU 11 generates a second file to be transmitted in which all the generated records are stored.

Next, in Step S203, the CPU 11 transmits the first and second files to the server machine 40 and thereby terminates the process.

By the foregoing process, data on all the employees belonging to the company is transmitted from the personnel management system 10 to the server machine 40.

Figure 17:
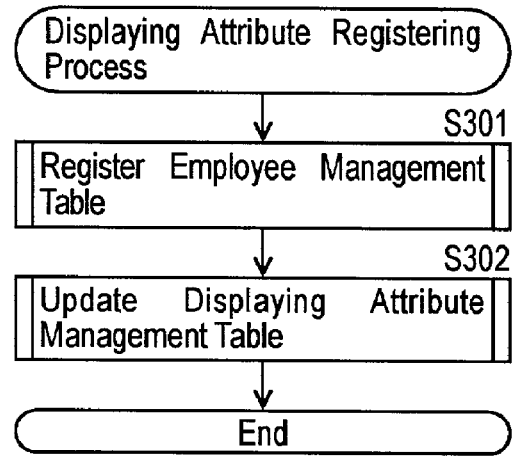
FIG. 17 is a flow chart illustrating a displaying attribute registering process performed in the server machine.

In the server machine 40 that has received the first and second transmitted files from the personnel management system 10, the displaying attribute registering program is read by the CPU 41, on reception of the files, whereby the displaying attribute registering process is initiated. FIG. 17 shows the displaying attribute registering process.

Figure 18:
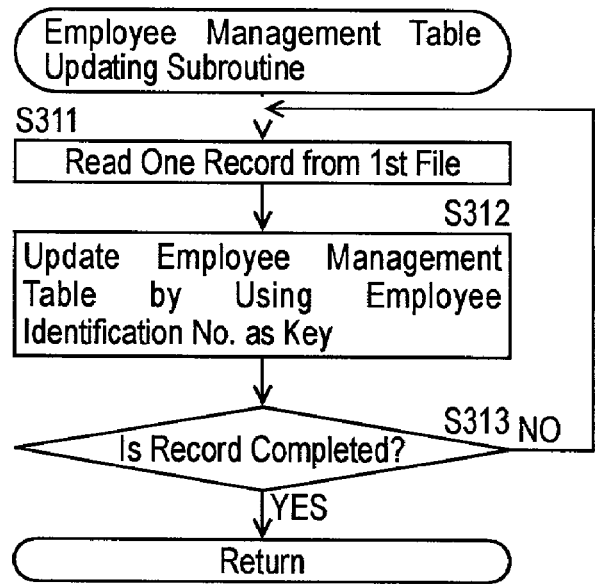
FIG. 18 is a flow chart illustrating an employee-management table updating subroutine performed in Step S301.

As shown in FIG. 17, in Step S301 which is the first step after the initiation of the displaying attribute registering process, the CPU 41 executes an employee-management-table updating subroutine. The employee-management-table updating subroutine is a process of updating the employee management table 63. FIG. 18 shows the employee-management-table updating subroutine.

As shown in FIG. 18, in Step S311 which is the first step of the employee-management-table updating subroutine, the CPU 41 reads one record out of the first file transmitted from the personnel management system 10.

Next, in Step S312, the CPU 41 checks whether or not a record containing the same employee identification number as contained in the record read in Step S311 is stored in the employee management table 63. If there is a record containing the same employee identification number as contained in the record read in Step S311 in the employee management table 63, the CPU 41 replaces the fields in the records in the employee management table 63 other than those of the log-in ID and the password with data in the respective fields contained in the record read in Step S311. On the other hands, if there is not any record containing the same employee identification number as contained in the record read in Step S311 in the employee management table 63, the CPU 41 assigns a new log-in ID and a new password to the record read in Step S311 and adds the record to the employee management table 63. The log-in ID and password thus newly assigned to the record read in Step S311 are reported to the personnel management system 10 of the file sender.

Next, in Step S313, the CPU 41 checks whether or not an unprocessed record exists in the first transmitted file. If there is an unprocessed record, the CPU 41 returns the whole process to Step S311. If there is no unprocessed record, the CPU 41 terminates the employee-management-table updating subroutine and advances to the process of Step S302 in a main routine shown in FIG. 17.

Figure 19:
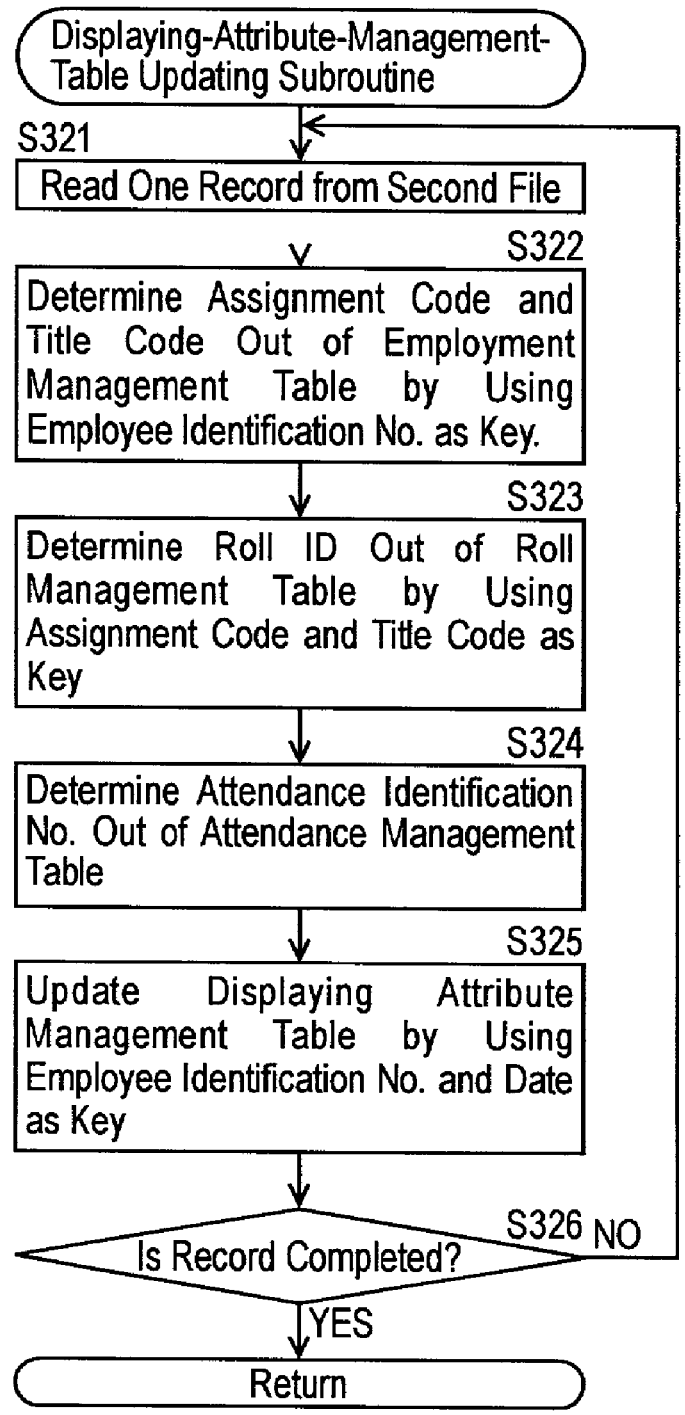
FIG. 19 is a flow chart illustrating a displaying-attribute-management table updating subroutine performed in Step S302.

In Step S302, the CPU 41 executes a displaying attribute-management-table updating subroutine. The displaying-attribute-management-table updating subroutine is a process of updating the displaying attribute management table 64. FIG. 19 shows the displaying-attribute-management-table updating subroutine.

As shown in FIG. 19, in Step S321 which is the first step of the displaying-attribute-management-table updating subroutine, the CPU 41 reads one record out of the second file transmitted from the personnel management system 10.

Next, in Step S322, the CPU 41 reads, out of the employee management table 63, the assignment code and the role code each corresponding to the employee identification number contained in the record read in Step S321.

Next, in Step S323, the CPU 41 reads, out of the roll management table 62, the roll ID corresponding to the assignment code and the roll code each read in Step S322.

Next, in Step S324, the CPU 41 reads, out of the attendance control table 65, the attendance identification number corresponding to the attendance code contained in the record read in Step S321.

Next, in Step S325, the CPU 41 adds the roll ID read in Step S323 and the attendance identification number read in Step S324 to the record read in Step S321. Then, the CPU 41 checks whether or not a record containing the same employee identification number and date as contained in the record after the addition is stored in the displaying attribute management table 64. If there is a record containing the same employee identification number and date as contained in the record after the addition is stored in the displaying attribute management table 64, the CPU 41 replaces the fields in that record in the displaying attribute management table 64 other than those of the employee identification number and the date with the record after the addition. Conversely, if there is not any record containing the same employee identification number and date as contained in the record after the addition is not stored in the displaying attribute management table 64, the CPU 41 adds the record after the addition (except for the attendance code) to the displaying attribute management table 64. In Step S325, the CPU 41 also performs the process of deleting a record having a date before this point in time from the displaying attribute management table 64.

Next, in Step S326, the CPU 41 checks whether or not an unprocessed record exists in the second transmitted file. If there is an unprocessed record, the CPU 41 returns the whole process to Step S321. If there is no unprocessed record, the CPU 41 terminates the displaying-attribute-management-table updating subroutine and subsequently terminates the main routine shown in FIG. 17.

By the foregoing displayed attribute registering process, the employee management table 63 and the displaying attribute management table 64 each corresponding to the company as the file sender are updated.

Web Page Display Process

Figure 20:
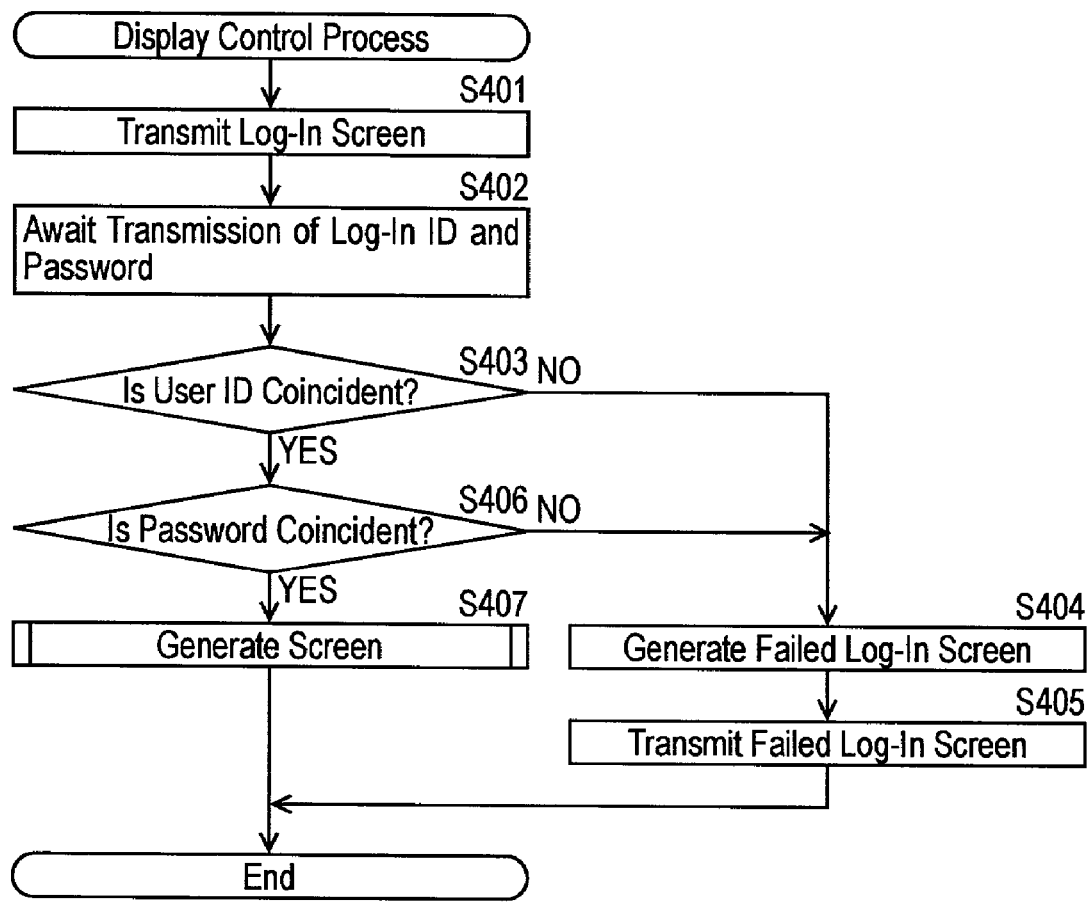
FIG. 20 is a flow chart illustrating a web page displaying process performed in the server machine.

After the respective processes of updating the tables 61 through 64 are thus completed, the server machine 40 responds to an access from any one of the employees belonging to the user company with a portal screen incorporated with contents corresponding to the employee. Specifically, if a request message is transmitted from the terminal 20 or 30 of the employee to the server machine 40, the web page providing program 69 is read by the CPU 41 so that a web page display process is performed. FIG. 20 shows the web page display process.

As shown in FIG. 20, in Step S401 which is the first step after the initiation of the web page display process, the CPU 41 transmits data indicative of a log-in screen not shown to the terminal 20 or 30. The log-in screen contains a pair of text boxes for inputting the log-in ID and password assigned to the employee belonging to the user, respectively, while it is configured to transmit the log-in ID and the password to the server machine 40.

Next, in Step S402, the CPU 41 awaits the transmission of a massage containing the log-in ID and the password from the terminal 20 or 30. When receiving the message containing the log-in ID and the password, the CPU 41 advances the whole process to Step S403.

In Step S403, the CPU 41 checks whether or not the log-in ID in the transmitted message coincides with any one of the log-in IDs stored in the employee management table 63. If the log-in ID in the transmitted message does not coincide with any of the log-in IDs stored in the employee management table 63, the CPU 41 advances the whole process to Step S404.

In Step S404, the CPU 41 generates an HTML file for displaying a screen indicative of the failure of the log-in process.

Next, in Step S405, the CPU 41 transmits the HTML file generated in Step S404 to the terminal 20 and terminates the web page display process.

Conversely, if it is determined in Step S403 that the log-in ID in the transmitted message coincides with any one of the log-in IDs stored in the employee management table 63, the CPU 41 advances the whole process to Step S406.

In Step S406, the CPU 41 checks whether or not the password in the transmitted message coincides with the password contained in the record in the employee management table 63 which also contains the foregoing log-in ID. If the two passwords do not coincide with each other, the CPU 41 advances the whole process to Step S404. Conversely, if the two passwords coincide with each other, the CPU 41 advances the whole process to Step S407.

Figure 21:
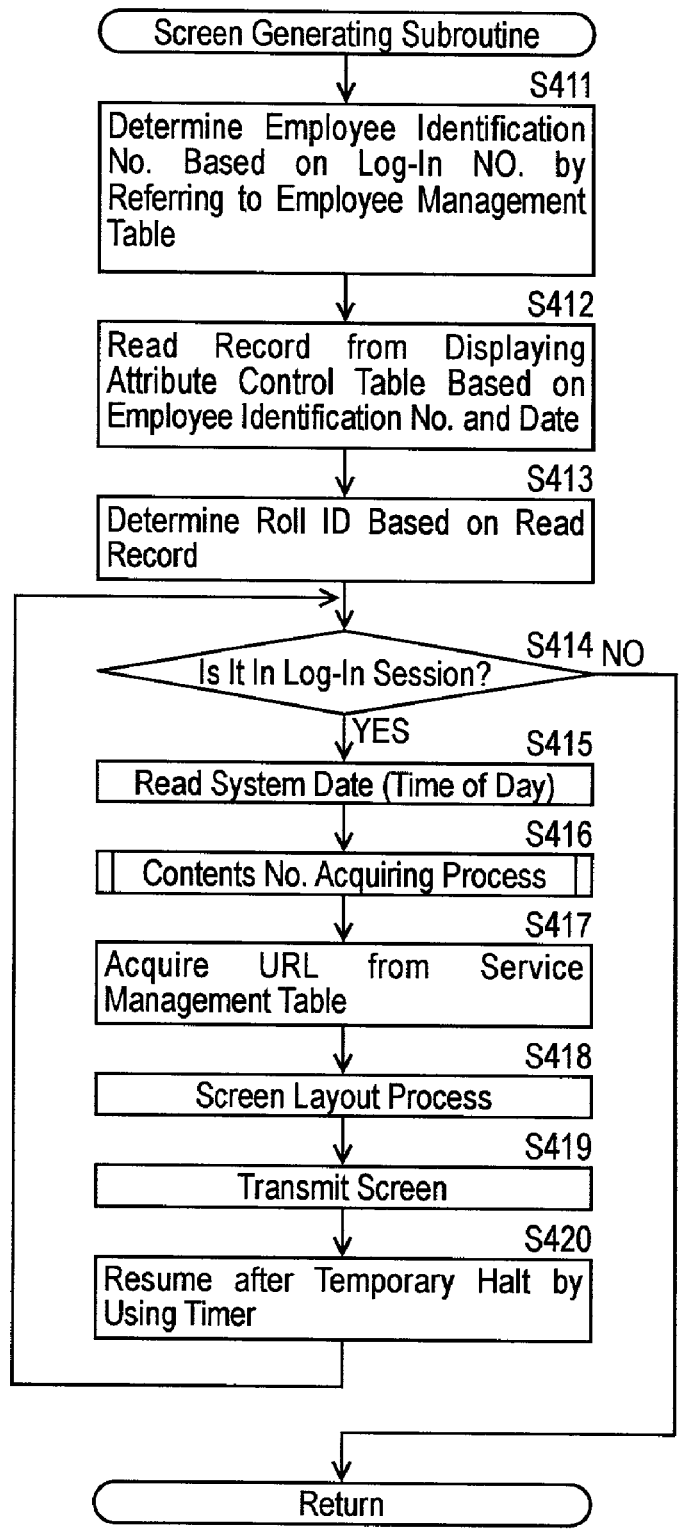
FIG. 21 is a flow chart illustrating a screen generating subroutine performed in Step S407.

In Step S407, the CPU 41 executes a screen generating subroutine. The screen generating subroutine is the process of generating hypertext data for displaying a portal screen with contents corresponding to the roll ID, the attendance identification number and the working hours each corresponding to the log-in ID and transmitting an HTML file stored with the generated hypertext data to the terminal 20 or 30 from which the access was made. FIG. 21 shows the screen generating subroutine.

As shown in FIG. 21, in Step S411 which is the first step of the screen generating subroutine, the CPU 41 reads, out of the employee management table 63, the employee identification number corresponding to the foregoing log-in ID.

Next, in Step S412, the CPU 41 reads a record containing the employee identification number read in Step S411 and the date of this point in time from the displaying attribute management table 64.

Next, in Step S413, the CPU 41 extracts the roll ID from the record read in Step S412.

Next, in Step S414, the CPU 41 checks whether or not the terminal 20 or 30 from which the access was made is in a log-in session. If the terminal 20 or 30 from which the access was made is not in the log-in session, the CPU 41 terminates the screen generating subroutine and subsequently terminates the display control process. Conversely, if the terminal 20 or 30 from which the access was made is in the log-in session, the CPU 41 advances the whole process to Step S415.

In Step S415, the CPU 41 reads the time and day of this point.

Figure 22:
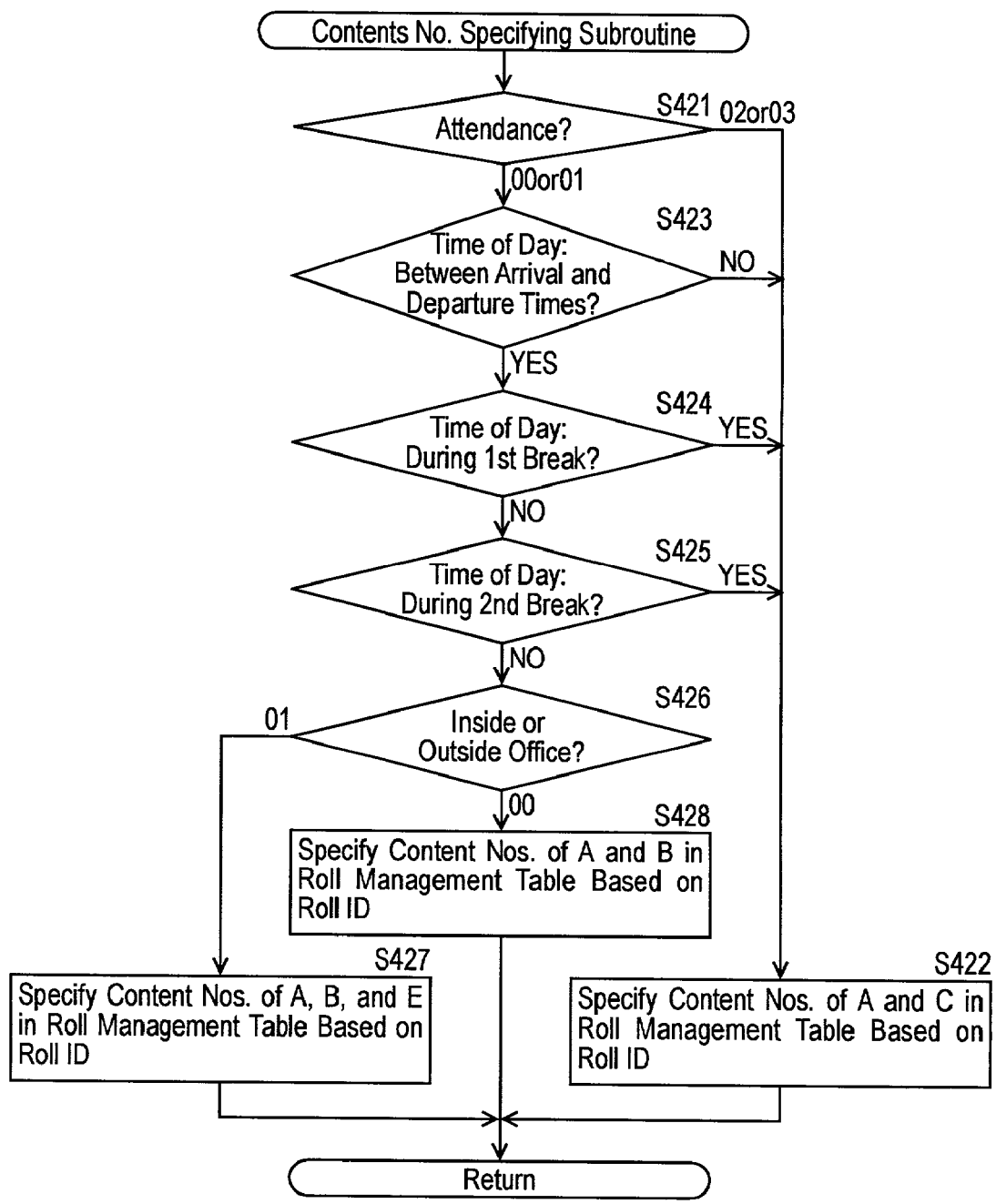
FIG. 22 is a flow chart illustrating a service number specifying subroutine executed in Step S417.

Next, in Step S416, the CPU 41 executes a content number specifying subroutine. The content number specifying subroutine is the process of selecting a content to be incorporated in the portal screen based on the date and time and day of this point. FIG. 22 shows the content number specifying subroutine.

As shown in FIG. 22, in Step S421 which is the first step of the contents number specifying subroutine, the CPU 41 checks whether or not the "attendance identification number" contained in the record read in Step S412 is "00" or "01" which indicates attendance or "02" or "03" which indicates absence. If the "attendance identification number" is "02" or "03", the CPU 41 advances the whole process to Step S422.

In Step S422, the CPU 41 specifies all content numbers of which "access condition" associated for the roll ID extracted in Step S413 is "A" or "C" by referring to the roll management table 62. For example, if the content of the roll management table 62 is as shown in FIG. 10 and if the "roll ID" extracted in Step S413 is "eigyo02", the content number "000001" with the "access condition" of "A" and the content number "000003" with the "access condition" of "C" are specified. After thus specifying the content numbers, the CPU 41 terminates the content number specifying subroutine and returns to the screen generating subroutine shown in FIG. 21.

Conversely, if it is decided that the "attendance identification number" is "00" or "01", the CPU 41 advances the whole process to Step S423.

In Step S423, the CPU 41 checks whether or not the time and day read in Step S415 falls between the "arrival time" and the "departure time" each contained in the record read in Step S412. If the read time and day does not fall between the "arrival time" and the "departure time", the CPU 41 advances the whole process to S422. Conversely, if the read time falls between the "arrival time" and the "departure time", the CPU 41 advances the whole process to Step S424.

In Step S424, the CPU 41 checks whether or not the time read in Step S415 falls between the "first break starting time" and the "first break time ending time" each contained in the record read in Step S412. If the read time of day falls between the "first break starting time" and the "first break ending time", the CPU 41 advances the whole process to Step S422. Conversely, if the read time of day does not fall between the "first break starting time" and the "first break ending time", the CPU 41 advances the whole process to Step S425.

In Step S425, the CPU 41 checks whether or not the time of day read in Step S415 falls between the "second break starting time" and the "second break ending time" each contained in the record read in Step S412. If the read time of day falls between the "second break starting time" and the "second break ending time", the CPU 41 advances the whole process to Step S422. Conversely, if the read time of day does not fall between the "second break starting time" and the "second break ending time", the CPU 41 advances the whole process to Step S426.

In Step S246, the CPU 41 checks whether or not the "attendance identification number" contained in the record read in Step S412 is "00" or "01". If the "attendance identification number" is "01", the CPU 41 advances the whole process to Step S427.

In Step S427, the CPU 41 specifies all content numbers of which "access condition" associated for the roll ID extracted in Step S413 is "A", "B" or "E" by referring to the roll management table. For example, if the content of the roll management table 62 is as shown in FIG. 10 and if the "roll ID" extracted in Step S413 is "seizo02", the content number "000002" with the "access condition" of "A", the content number "000004" with the "access condition" of "B", and the content number "000005" with the "access condition" of "E" are specified. After thus specifying the content numbers, the CPU 41 terminates the content number specifying subroutine and returns to the screen generating subroutine shown in FIG. 21.

Conversely, if the "attendance identification number" is determined to be "00" in Step S426, the CPU 41 advances the whole process to Step S428.

In Step S428, the CPU 41 specifies all content numbers of which "access condition" associated for the roll ID extracted in Step S413 is "A" or "B" by referring to the roll management table. After thus specifying the content numbers, the CPU 41 terminates the content number specifying subroutine and returns to the screen generating subroutine shown in FIG. 21.

In the screen generating subroutine shown in FIG. 21 to which the whole process has been returned after the content number specifying process was thus performed, the CPU 41 advances the whole process to Step S417.

In Step S417, the CPU 41 reads respective URLs corresponding to the content numbers specified in Steps S416 (S422, S427, and S428) out of the content management table 61.

Next, in Step S418, the CPU 41 generates, based on the URLs read in Step S417, hypertext data for displaying a portal screen having a layout as shown in the layout column of the table shown in FIG. 23. As shown in FIG. 23, the portal screen is divided into a reverse-L-shaped frame and a rectangular region in each screen layout. In the reverse-L-shaped frame, a content common to all employees (a shared content different from the contents registered in the contents management table 61) is incorporated. The rectangular region is subdivided into a plurality of rectangular frames in which respective links to the URLs read in Step S417 are defined. If the "roll ID" of the employee who accessed the server machine 40 is "eigyo02" and the access time is 17:00, the content numbers "000001", "000004", and "000005" corresponding to the "access condition" of "A", "B", or "E" in the roll management table 62 shown in FIG. 10 are specified since the time and day of this point falls within the working hours of the employee. Consequently, the links to the URLs corresponding to these content numbers, i.e., the URL of the page about sales support, the URL of the content about the reimbursement for business trip expenses, and the URL of the page about route services are defined in the respective rectangular frames of the portal screen. After the hypertext data for displaying the portal screen having such a layout is generated, the CPU 41 advances the whole process to Step S419.

In Step S419, the CPU 41 transmits an HTML file in which the hypertext data generated in Step S418 is stored to the terminal 20 or 30.

Next, in Step S420, the CPU 41 stands by for a specified period of time. After a lapse of the specified period of time, the CPU 41 returns the whole process to Step S414.

By thus performing the process loop consisting of Steps S414 through S420, the content and layout of the portal screen displayed on the terminal 20 or 30 are switched depending on the time and day read in Step S415 even if the terminal 20 is in the same log-in session. When the terminal 20 discontinues the log-in session during the execution of the process loop consisting of Step S414 through S420, the CPU 41 terminates the screen generating subroutine and returns to the main routine shown in FIG. 20. After returning to the main routine shown in FIG. 20, the CPU 41 terminates the web page display process.

As a result of performing the process shown above, the WWW browser executed in the terminal 20 that has received the HTML file transmitted in Step S419 displays, on the display 20a, the portal screen having the common content incorporated in that reverse-L-shaped frame in accordance with the hypertext data in the received HTML file, accesses each of the URLs to which links are defined in the respective rectangular frames of the portal screen, and incorporates the screens of web pages at sites indicated by the respective URLs in the rectangular frames in which the links to the URLs are defined. The portal screen displayed on the display 20a of the terminal 20 is incorporated with only a content according to the attribute (that is, assigned department and role) and work schedule (that is, working hours and attendance) of an employee. Even if the terminal 20 is in the same log-in session with respect to the server machine 40, the CPU 41 of the server machine 40 constantly checks whether or not the current time and day falls within the working hours of the employee so that, if the current time and day changes to come out of the working hours of the employee and fall within the off-duty hours, the type of the content incorporated in the portal screen changes in accordance with the access condition registered in the roll management table 62.

Hence, the user company can allow each of the employees who accesses the server machine 40 to view the portal screen in which limited contents are incorporated in accordance with his or her attribute and work schedule. On the other hand, the employee is allowed to view the portal screen with content corresponding to his or her attribute and work schedule by inputting his or her log-in ID and password in accessing the server machine 40.

Thus, according to the present embodiment, even if the working hours of an employee is irregular and his or her attendance schedule changes suddenly, the portal screen with content corresponding to his or her actual working hours and whereabout after the change is transmitted to the terminal 20 or 30 of the employee.

As described above, the present invention allows, even if the work schedules (that is, working hours and attendance) of respective employees belonging to a user who request web pages intended for the employees are irregular or change suddenly, the web pages with content according to their work schedules to be provided to the employees.

We claim:

1. A web page providing method for providing a web screen with a content to a terminal, operated by any one of employees belonging to a user, via a network, the method comprising:
   updating, in response to an instruction from the user, a first table defining a role of each of the employees, a second table defining providable contents and their providing conditions for every role, and a third table defining a work schedule of each of the employees including actual working hours of each of the employees;
   reading, if the web screen is requested from a terminal operated by any one of the employees, the role of the employee out of the first table;
   reading a definition of content providable for the role read out of the first table and its providing condition from the second table, wherein
      the providing condition for a content defined in the second table includes a condition that the web screen is requested within the actual working hours;
   reading the work schedule of an employee out of the third table;
   generating screen data for displaying a screen incorporated with at least one content defined by the definition read out of the second table of which the providing condition is satisfied by the work schedule read out of the third table; and
   transmitting the generated screen data to the terminal.

2. The web page providing method according to claim 1, wherein
   the role of each of the employees defined in the first table is a department to which each of the employees is assigned and/or a title of each of the employees.

3. The web page providing method according to claim 1, wherein
the providing condition for a content defined in the second table includes a condition that the web screen is requested outside the actual working hours.

4. The web page providing method according to claim 1, wherein
the work schedule of each of the employees defined in the third table includes data indicative of whether or not each of the employees is on a business trip, and
the providing condition for a content defined in the second table includes a condition that a requesting employee is on a business trip.

5. A computer-readable medium storing a web page providing program to be read by a computer capable of communicating with a terminal via a network, the web page providing program making the computer execute:
updating, in response to an instruction from a user, a first table defining a role of each of employees belonging to the user, a second table defining providable contents and their providing conditions for every role, and a third table defining a work schedule of each of the employees, wherein
the role of each of the employees defined in the first table is a department to which each of the employees is assigned and/or a title of each of the employees,
the work schedule of each of the employees defined in the third table includes actual working hours of each of the employees, and
the providing condition for a content defined in the second table includes a condition that the web screen is requested within the actual working hours;
reading, if a web screen is requested from a terminal operated by any one of the employees, the role of an employee out of the first table;
reading a definition of content providable for the role read out of the first table and its providing condition from the second table;
reading the work schedule of the employee out of the third table;
generating screen data for displaying a screen incorporated with at least one content defined by the definition read out of the second table of which the providing condition is satisfied by the work schedule read out of the third table; and
transmitting the generated screen data to the terminal.

6. A server machine capable of communicating with a terminal via a network, the server machine comprising:
a communicating unit transmitting and receiving data to and from the terminal;
a processing unit performing a variety of processes in accordance with a program;
a first storage unit storing a first table defining a role of each of employees belonging to a user, a second table defining providable contents and their providing conditions for every role, and a third table defining a work schedule of each of the employees, wherein
the role of each of the employees defined in the first table is a department to which each of the employees is assigned and/or a title of each of the employees,
the work schedule of each of the employees defined in the third table includes actual working hours of each of the employees, and
the providing condition for a content defined in the second table includes a condition that the web screen is requested within the actual working hours; and a second storage unit storing a program making the processing unit update each of the tables in response to an instruction from a terminal operated by the user that has been received via the communicating unit, and making the processing unit, if a request for a web screen is received from a terminal operated by any one of the employees via the communicating unit, read the role of an employee out of the first table, read a definition of content providable for the role read out of the first table and its providing condition from the second table, read the work schedule of the employee out of the third table, generate screen data for displaying a screen incorporated with at least one content defined by the definition read out of the second table of which the providing condition is satisfied by the work schedule read out of the third table, and transmit the generated screen data to the terminal via the communicating unit.

7. A web page providing method for providing a web screen with a content to a terminal, operated by any one of employees belonging to a user, via a network, the method comprising:
updating, in response to an instruction from the user, a first table defining a role of each of the employees, a second table defining providable contents and their providing conditions for every role, and a third table defining a work schedule of each of the employees, wherein
the role of each of the employees defined in the first table is a department to which each of the employees is assigned and/or a title of each of the employees,
the work schedule of each of the employees defined in the third table includes actual working hours of each of the employees, and
the providing condition for a content defined in the second table includes a condition that the web screen is requested within the actual working hours;
reading, if the web screen is requested from a terminal operated by any one of the employees, the role of the employee out of the first table;
reading a definition of content providable for the role read out of the first table and its providing condition from the second table;
reading the work schedule of an employee out of the third table;
generating screen data for displaying a screen incorporated with at least one content defined by the definition read out of the second table of which the providing condition is satisfied by the work schedule read out of the third table; and
transmitting the generated screen data to the terminal.

8. The web page providing method according to claim 7, wherein
the providing condition for a content defined in the second table includes a condition that the web screen is requested outside the actual working hours.

9. The web page providing method according to claim 7, wherein
the work schedule of each of the employees defined in the third table includes data indicative of whether or not each of the employees is on a business trip, and
the providing condition for a content defined in the second table includes a condition that a requesting employee is on a business trip.

* * * * *